(12) United States Patent
Bäckman

(10) Patent No.: US 8,962,116 B2
(45) Date of Patent: Feb. 24, 2015

(54) PIPES MADE FROM A POLYETHYLENE COPOLYMER WITH SLOW CRACK GROWTH

(75) Inventors: Mats Bäckman, Gothenburg (SE); Siv Rundqvist, legal representative, Värmlands Nysater (SE)

(73) Assignee: Borealis A.G., Vienna (AT)

( * ) Notice: Subject to any disclaimer, the term of this patent is extended or adjusted under 35 U.S.C. 154(b) by 154 days.

(21) Appl. No.: 13/513,908

(22) PCT Filed: May 26, 2011

(86) PCT No.: PCT/EP2011/002614
§ 371 (c)(1),
(2), (4) Date: Sep. 6, 2012

(87) PCT Pub. No.: WO2012/007082
PCT Pub. Date: Jan. 19, 2012

(65) Prior Publication Data
US 2013/0122228 A1 May 16, 2013

(30) Foreign Application Priority Data

Jul. 13, 2010 (EP) .................................. 100072149

(51) Int. Cl.
| | | |
|---|---|---|
| *B29D 22/00* | (2006.01) | |
| *B29D 23/00* | (2006.01) | |
| *C08K 5/13* | (2006.01) | |
| *C08L 23/04* | (2006.01) | |
| *C08L 23/06* | (2006.01) | |
| *C08L 23/08* | (2006.01) | |
| *C08K 5/134* | (2006.01) | |

(52) U.S. Cl.
CPC ............... *C08K 5/13* (2013.01); *C08L 2666/06* (2013.01); *C08K 5/1345* (2013.01); *C08L 23/04* (2013.01); *C08L 23/06* (2013.01); *C08L 23/0815* (2013.01); *C08L 2205/02* (2013.01)
USPC ........................................ 428/36.92; 524/348

(58) Field of Classification Search
CPC . C08L 23/04; C08L 2666/06; C08L 23/0815; C08K 5/13
USPC ........................................ 428/36.92; 524/348
See application file for complete search history.

(56) References Cited

FOREIGN PATENT DOCUMENTS

| | | |
|---|---|---|
| EP | 0 517 868 | 11/1995 |
| EP | 0 810 235 | 12/1997 |
| EP | 1 201 713 | 5/2002 |
| EP | 2072587 A1 * | 6/2009 |
| WO | WO 00/22040 | 4/2000 |
| WO | WO 2004/055068 | 7/2001 |
| WO | WO 01/62839 | 8/2001 |
| WO | WO 2004/055069 | 7/2004 |

OTHER PUBLICATIONS

International Search Report mailed Aug. 19, 2011 for International Application No. PCT/EP2011/002614.
Written Opinion mailed Aug. 19, 2011 for International Application No. PCT/EP2011/002614.
Reply to Written Opinion mailed May 7, 2012 for International Application No. PCT/EP2011/002614.

* cited by examiner

*Primary Examiner* — Michael C Miggins
(74) *Attorney, Agent, or Firm* — Fay Sharpe LLP

(57) ABSTRACT

The present invention relates to a pipe consisting of a polyethylene composition which comprises—a base resin, comprising •a first ethylene homo- or copolymer (A): and •a second ethylene copolymer (B); and the polyethylene composition further comprises—a phenol-type stabilizer (C); and—a phenol-type stabilizer (D); whereby stabilizers (C) and (D) are different. The present invention is furthermore directed to the use of—a phenol-type stabilizer (C); and—a phenol-type stabilizer (D); whereby stabilizers (C) and (D) are different and, optionally,—a further stabilizer (E) selected from •phosphorous containing stabilizer (E1); •sulphur containing stabilizers (E2); •nitrogen containing stabilizers (E3); and/or •mixtures thereof; for increasing the slow crack growth resistance of pipes.

20 Claims, No Drawings

PIPES MADE FROM A POLYETHYLENE COPOLYMER WITH SLOW CRACK GROWTH

The present invention relates to a pipe with improved crack resistance made from a polyethylene composition.

Installation of pipes in general but especially of buried or submerged pipes is costly and in case a pipe fails, repairing or replacing the pipe is not only expensive but also time-consuming. For the reliability of pipes a good slow crack growth is of particular importance.

For the determination of the slow crack growth resistance different methods may be used, first the PENT test according to ASTM F 1473 and second the full notch creep test (FNCT) according to ISO 16770:2004. Since both test standards cover different aspects of crack growth a pipe should have a good performance in both test methods.

The demand for pipes with improved slow crack growth is constantly increasing in many countries. For example in Germany pipes for sand bed free laying applications now require a failure time of at least 3300 h in the FNCT test.

However, pipes known in the prior art still suffer from inadequate stabilization leading to severe limitations in practical use. Optimized stabilization is particularly necessary for pipes having increased lifetime and/or increased stability due to optimized chemical structure being reflected in, for example optimized molecular weight distribution and rheological properties.

It is thus an object of the present invention to provide polyethylene pipes avoiding the disadvantages of the prior art, particularly providing polyethylene pipes which show a good pressure resistance i.e. have a good performance in the PENT and the FNCT test and further show good processability, such as extrudability, and good mechanical properties, such as improved surface quality.

It has surprisingly been found that the object of the present invention can be achieved with a polyethylene composition which comprises
  a base resin comprising
    a first ethylene homo- or copolymer (A); and
    a second ethylene copolymer (B);
  and the polyethylene composition further comprises
  a phenol-type stabilizer (C); and
  a phenol-type stabilizer (D);
  whereby stabilizers (C) and (D) are different.

Therefore, the present invention provides a pipe consisting of
  a polyethylene composition which comprises
    a base resin comprising
      a first ethylene homo- or copolymer (A); and
      a second ethylene copolymer (B);
    and the polyethylene composition further comprises
      a phenol-type stabilizer (C); and
      a phenol-type stabilizer (D);
    whereby stabilizers (C) and (D) are different.

The pipe according to the invention surprisingly has a good performance in the PENT and the FNCT test and further shows good processability, such as extrudability, and good mechanical properties, such as improved surface quality.

The numbering of chemical groups, as used herein, is in accordance with the IUPAC system in which the groups of the periodic system of the elements are numbered from 1 to 18.

Furthermore, wherever herein the term "polyolefin" (or "polyethylene") is used both olefin homo- or copolymers (or ethylene homo- or copolymers) are meant.

The term "base resin" denotes the entirety of polymeric components in the polyethylene composition according to the invention, preferably making up at least 80 wt. % of the total polyethylene composition, more preferably at least 85 wt. %, even more preferably at least 90 wt. %, even more preferably at least 95 wt. % and most preferably at least 97 wt. % of the polyethylene composition.

The base resin optionally further comprises a prepolymer fraction in an amount of up to 20 wt. %, preferably up to 10 wt. %, more preferably up to 5 wt. % and most preferably up to 3 wt. % of the total base resin.

In case a prepolymer fraction is present, the total amount of components (A), (B) and the prepolymer fraction, is preferably at least 85 wt. % of the base resin, more preferably is at least 92 wt. % of the base resin, even more preferably is at least 97 wt. % of the base resin, most preferably, the base resin is consisting of components (A), (B) and the prepolymer fraction.

Preferably, in case a prepolymer fraction is not present, the total amount of components (A) and (B) is at least 85 wt. % of the base resin, more preferably is at least 92 wt. % of the base resin, even more preferably is at least 97 wt. % of the base resin, and most preferably the base resin is consisting of fractions (A) and (B). Within the context of this application the term "substituent" denotes all substituents known in the art, preferably the term "substituent" denotes groups which are connected through a hetereoatom to the respective hydrocarbyl group.

The base resin preferably has a density of more than or equal to 942 kg/m³, more preferably more than or equal to 944 kg/m³ most preferably more than or equal to 946 kg/m³. Usually, the density of the base resin will be below 952 kg/m³.

Preferably components (C) and (D) differ in that component (C) contains at least one ester group and component (D) does not contain any ester group.

Component (C) is preferably a compound according to the following formula (I)

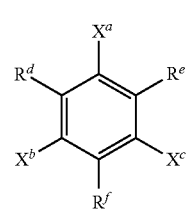

(I)

wherein
  $R^d$, $R^e$ and $R^f$ independently are non-substituted or substituted aliphatic or aromatic hydrocarbyl radicals which independently may comprise heteroatoms,
  $X^a$, $X^b$, and $X^c$ independently are H or OH, with the proviso that at least one of $X^a$, $X^b$, and $X^c$ is OH, and
  the entire molecule comprises at least one ester group, preferably two to six ester groups and most preferably three to five ester groups.

In compound (C) according to formula (I) residues $R^d$, $R^e$ and $R^f$ independently are non-substituted or substituted aliphatic or aromatic hydrocarbyl radicals which independently may comprise heteroatoms. This means that apart from the at least one ester group in the entire molecule, further heteroatoms or heteroatomic groups may be present.

Preferably, at least one of residues $R^d$, $R^e$ and $R^f$ comprises at least one OH-group. Still more preferably, only one of residues $R^d$, $R^e$ and $R^f$ comprises at least one OH-group, and more preferably the other two residues do not comprise any heteroatom. The latter preferred embodiment means that both the at least one ester group and the at least one OH-group are comprised in the same residue selected from $R^d$, $R^e$ and $R^f$.

Preferably, no further heteroatoms besides OH-groups and ester groups are present in $R^d$, $R^e$ and $R^f$, so that phenolic stabilizer (C) is e.g. free of amine/amide groups and groups containing phosphorus.

Preferably, $R^d$, $R^e$ and $R^f$ are aliphatic radicals.

Preferably, $R^d$, $R^e$ and $R^f$ independently have from 2 to 200 carbon atoms.

Preferably, $R^d$ and $R^e$ independently have from 2 to 20 carbon atoms, more preferably from 3 to 10 carbon atoms.

Furthermore, it is preferred that $R^d$ and/or $R^e$, more preferably $R^d$ and $R^e$, are aliphatic hydrocarbyl groups with at least 3 carbon atoms which have a branch at the carbon atom connected to the aromatic ring, and most preferably $R^d$ and/or $R^e$, more preferably $R^d$ and $R^e$, are tert. butyl groups.

Preferably, $R^f$ has from 20 to 100 carbon atoms, more preferably has from 30 to 70 carbon atoms.

Furthermore, it is preferred that $R^f$ includes one or more phenyl residues.

Still further, it is preferred that $R^f$ includes one or more hydroxyphenyl residues.

Preferably, in compound (C) of formula (I) $X^a$ is OH, and most preferably $X^a$ is OH and $X^b$ and $X^c$ are H.

Non limiting examples of component (C) are Pentaerythrityl-tetrakis(3-(3',5'-di-tert.butyl-4-hydroxyphenyl)-propionate [CAS-no. 6683-19-8], Octadecyl 3-(3',5'-di-tert.butyl-4-hydroxyphenyl)propionate [CAS-no. 2082-79-3], Bis-(3, 3-bis-(4-'-hydroxy-3'-tert.butylphenyl)butanic acid)-glycolester [CAS-no. 32509-66-3], 3,9-bis(1,1-dimethyl-2-(beta-(3-tert. butyl-4-hydroxy-5-methylphenyl) propionyloxy) ethyl)-2,4,8,10-tetraoxaspiro (5,5) undecane [CAS-no. 90498-90-1], 6-Hexanediyl-bis(3,5-bis (1,1-dimethylethyl)-4-hydroxybenzene-propanoate) [CAS-no. 35074-77-2], Triethyleneglycol-bis-(3-tert.butyl-4-hydroxy-5 methylphenyl) propionate [CAS-no. 36443-68-2], $C_8$ to $C_{20}$ alkyl esters of 3,5-bis(1,1-dimethylethyl)-4-hydroxy-benzenepropanoic acid, 1,1,3-tris[2-methyl-4-[3-(3,5-di-t-butyl-4-hydroxyphenyl) propionyloxy]-5-t-butylphenyl] butane [CAS-no. 180002-86-2], whereof Pentaerythrityl-tetrakis(3-(3',5'-di-tert.butyl-4-hydroxyphenyl)-propionate is preferred.

Preferably, the phenol-type stabilizer (D) does not contain ester groups.

Further, preferably, the phenol-type stabilizer (D) only contains heteroatoms in the form of hydroxyl groups, i.e. is free of amine/amide groups and groups containing phosphorus.

Preferably, phenol-type stabilizer (D) is a compound of the following formula (II)

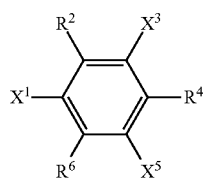

(II)

wherein
$X^1$, $X^3$ and $X^5$ are independently selected from hydrogen and hydroxyl groups, provided that at least one of $X^1$, $X^3$ and/or $X^5$ is a hydroxyl group, preferably one or two of $X^1$, $X^3$ and/or $X^5$ are hydroxyl groups, more preferably only one of $X^1$, $X^3$ or $X^5$ is a hydroxyl group;

and
$R^2$, $R^4$ and/or $R^6$ are independently selected from substituted or unsubstituted hydrocarbyl groups and may contain hydroxyl groups, preferably, provided that the phenol-type stabilizer according to formula (II) contains more than one hydroxyl group each pair of hydroxyl groups is connected through a sequence of carbon atoms which is not interrupted by a heteroatom.

Preferably, in the phenol-type stabilizer according to formula (II) at least one of $R^2$, $R^4$ or $R^6$ contains hydroxyl group(s), more preferably, only one of $R^2$, $R^4$ or $R^6$ contains hydroxyl group(s).

Preferably, in the phenol-type stabilizer according to formula (II) one, more preferably two, of $R^2$, $R^4$ and $R^6$ is/are selected from substituted or unsubstituted, $C_1$- to $C_{20}$-hydrocarbyl groups, wherefrom unsubstituted $C_1$- to $C_{20}$-hydrocarbyl groups are preferred, more preferably from substituted or unsubstituted, $C_1$- to $C_{10}$-hydrocarbyl groups, wherefrom unsubstituted $C_1$- to $C_{10}$-hydrocarbyl groups are preferred and most preferably from unsubstituted $C_4$- to $C_{10}$-hydrocarbyl groups (e.g. tert-butyl);

Preferably, in the phenol-type stabilizer according to formula (II) each of $R^2$, $R^4$, $R^6$ has a molecular weight of not more than 350 g/mol, more preferably of not more than 300 g/mol, even more preferably of not more than 250 g/mol and most preferably of not more than 200 g/mol;

Preferably, the phenol-type stabilizer (D) according to formula (II) only contains heteroatoms in the form of hydroxyl groups.

Further, preferably, the phenol-type stabilizer (D) according to formula (II) does not contain ester groups.

More preferably, phenol type stabilizer (D) is a compound of the following formula (III)

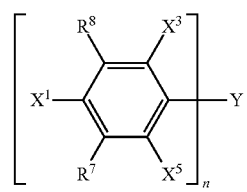

(III)

wherein
$X^1$, $X^3$ and $X^5$ are independently selected from hydrogen and hydroxyl groups, provided that at least one of $X^1$, $X^3$ and/or $X^5$ is a hydroxyl group, preferably one or two of $X^1$, $X^3$ and/or $X^5$ are hydroxyl groups, more preferably only one of $X^1$, $X^3$ or $X^5$ is a hydroxyl group and most preferably $X^1$ is a hydroxyl group and $X^3$ and $X^5$ are hydrogen;

n is an integer selected from 1, 2, 3, 4, 5 and 6, preferably from 1, 2, 3 and 4 and most preferably from 3 or 4;

$R^7$ and $R^8$ are independently selected from substituted or unsubstituted, $C_1$- to $C_{20}$-hydrocarbyl groups, wherefrom unsubstituted $C_1$- to $C_{20}$-hydrocarbyl groups are preferred, more preferably from substituted or unsubstituted, $C_1$- to $C_{10}$-hydrocarbyl groups, wherefrom unsubstituted $C_1$- to $C_{10}$-hydrocarbyl groups are preferred and most preferably from unsubstituted $C_4$- to $C_{10}$-hydrocarbyl groups (e.g. tert-butyl);

and
Y is a substituted or unsubstituted $C_1$- to $C_{40}$-hydrocarbyl group, wherefrom an unsubstituted $C_1$- to $C_{40}$-hydrocarbyl group is preferred, more preferably a substituted or unsubstituted, $C_5$- to $C_{30}$-hydrocarbyl group, wherefrom an unsubstituted $C_5$- to $C_{30}$-hydrocarbyl group is preferred, even more preferably a substituted or unsubstituted $C_9$- to $C_{20}$-hydrocarbyl group, wherefrom an unsubstituted $C_9$- to $C_{20}$-hydrocarbyl group is preferred and most preferably a substituted or unsubstituted, $C_{12}$- to $C_{15}$-hydrocarbyl group, wherefrom an unsubstituted, $C_{12}$- to $C_{15}$-hydrocarbyl group is preferred;

Preferably, in the phenol type stabilizer (D) according to formula (III) the only substituents on Y are hydroxyl groups and most preferably Y is not substituted by heteroatom containing substituents, thus, not containing heteroatoms.

The phenol-type stabilizer (D) according to formula (III) preferably does not contain ester groups.

Preferably, the phenol-type stabilizer (D) according to formula (III) contains heteroatoms only in the form of hydroxyl groups. Preferably, in the phenol type stabilizer according to formula (III) Y contains an aromatic system, more preferably a benzene ring.

Non limiting examples of component (D) are 1,3,5-tri-methyl-2,4,6-tris-(3,5-di-tert.butyl-4-hydroxyphenyl) benzene [CAS-no. 1709-70-2], 2,6-di-tert. butyl-4-methyl phenol [CAS-no. 128-37-0], 2,2'-methylene-bis(6-(1-methyl-cyclohexyl) para-cresol) [CAS-no. 77-62-3], 2,2'-Ethylenebis (4,6-di-tert.butylphenol) [CAS-no. 35958-30-6], 1,1,3-Tris (2-methyl-4-hydroxy-5-tert. butylphenyl) butane [CAS-no. 1843-03-4], 2,6-di-tert. butyl-4-nonylphenol [CAS-no. 4306-88-1], 4,4'-butylidenebis(6-tert. butyl-3-methylphenol) [CAS-no. 85-60-9], Name: 2,2'-methylene bis (4-methyl-6-tert.butylphenol) [CAS-no. 119-47-1], whereof 1,3,5-tri-methyl-2,4,6-tris-(3,5-di-tert. butyl-4-hydroxyphenyl) benzene is preferred.

In addition to components (C) and (D) the polyethylene composition preferably further comprises
   a further stabilizer (E) selected from
      phosphorous containing stabilizer (E1);
      sulphur containing stabilizers (E2);
      nitrogen containing stabilizers (E3); and/or
      mixtures thereof.

Component (E1) may be a phosphite or a phosphonite, wherefrom a phosphite is especially preferred.

More preferably, stabilizer (E1) is selected from compounds of the following formula (IV)

$$R^{10}\text{---}[X\text{---}P(\text{---}Y\text{---}R^{11})_2]_n \tag{IV}$$

wherein n is an integer selected from 1, 2, 3 or 4, preferably, 1 or 2 more preferably 1;

$R^{10}$ is a $C_1$- to $C_{50}$-hydrocarbyl group, optionally containing heteroatoms, more preferably a $C_2$- to $C_{40}$-hydrocarbyl group, optionally containing heteroatoms, even more preferably a $C_6$- to $C_{25}$-hydrocarbyl group, optionally containing heteroatoms and most preferably a $C_{10}$- to $C_{18}$-hydrocarbyl group, optionally containing heteroatoms, e.g. a 2,4-di-tert-butyl-phenyl group;

each X is either no atom, such that there is a direct bond between the phosphor atom and $R^{10}$, or is selected from oxygen and/or sulphur, preferably X is either no atom or oxygen and most preferably X is oxygen;

each Y is independently either no atom, such that there is a direct bond between the phosphor atom and $R^{11}$, or is selected from oxygen and/or sulphur, preferably Y is either no atom or oxygen and most preferably Y is oxygen;

Each $R^{11}$ is independently selected from $C_1$- to $C_{40}$-hydrocarbyl groups, optionally containing heteroatoms, more preferably independently selected from $C_2$- to $C_{30}$-hydrocarbyl group(s), optionally containing heteroatoms, even more preferably independently selected from $C_6$- to $C_{20}$-hydrocarbyl group(s), optionally containing heteroatoms and most preferably independently selected from $C_{10}$- to $C_{18}$-hydrocarbyl group(s), optionally containing heteroatoms, e.g. a 2,4-di-tent-butyl-phenyl group;

optionally, the structural unit $P(\text{---}Y\text{---}R^{11})_2$ contains a ring closure, i.e. there is a direct bond between the two residues $R^{11}$;

or stabilizer (E1) is selected from compounds of the following formula (V)

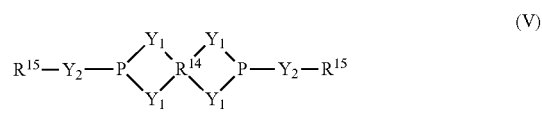

(V)

wherein

Each $Y_1$ is independently selected from oxygen, sulfur, nitrogen and —$CH_2$—, preferably, each $Y_1$ is oxygen;

Each $Y_2$ is independently either no atom such that there is a direct bond between $R^{15}$ and P, or selected from oxygen, sulfur, nitrogen and —$CH_2$—, preferably, each $Y_2$ is either no atom or oxygen and most preferably each $Y_2$ is oxygen;

$R^{14}$ has
   from 3 to 20 carbon atoms, preferably 3 to 10 carbon atoms and most preferably 4 to 6 carbon atoms;
   from 0 to 3 heteroatoms, preferably 0 or 1 heteroatom, most preferably $R^{14}$ does not contain heteroatoms; if, however, $R^{14}$ contains heteroatoms, the heteroatom is selected from oxygen, sulfur, nitrogen and phosphorous, preferably oxygen;

Each $R^{15}$ has
   from 6 to 40 carbon atoms, preferably 10 to 30 carbon atoms and most preferably from 12 to 26 carbon atoms;
   from 0 to 3 heteroatoms, preferably 0 or 1 heteroatom, most preferably $R^{15}$ does not contain heteroatoms; if, however, $R^{15}$ contains heteroatoms, the heteroatom is selected from oxygen, sulfur, nitrogen and phosphorous;

preferably, the compound of formula (V) is selected from compounds of the following formula (VI)

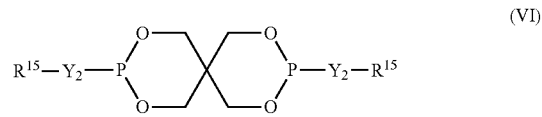

(VI)

wherein $R^{15}$ and $Y_2$ are as defined for formula (V) above, even more preferably, stabilizer (E1) is selected from compounds of formula (IV).

In case $R^{10}$ and/or $R^{11}$ of formula IV contain heteroatoms they are preferably selected from oxygen, sulphur, phosphor and nitrogen, more preferably from oxygen and nitrogen and most preferably from oxygen. The oxygen heteroatoms are preferably present in $R^{10}$ and/or $R^{11}$ in the form of hydroxyl groups.

In case $R^{10}$ and/or $R^{11}$ of formula IV contain heteroatoms, preferably $R^{10}$ and/or $R^{11}$ does not contain more than three heteroatoms, more preferably one heteroatom. However, preferably, $R^{10}$ does not contain heteroatoms.

Non limiting examples of component (E1) are Tris(2,4-ditert-butylphenyl)phosphate [CAS-no. 31570-04-4], Tetrakis-(2,4-di-t-butylphenyl)-4,4'-biphenylen-di-phosphonite [CAS-no. 38613-77-3], Bis (2,4-di-t-butylphenyl)-pentaerythrityl-di-phosphite [CAS-no. 26741-53-7], Di-stearyl-pentaerythrityl-di-phosphite [CAS-no. 3806-34-6], Tris-nonylphenyl phosphite [CAS-no. 26523-78-4], Bis(2,6-di-t-butyl-4-methylphenyl) pentaerythrityl-di-phosphite [CAS-no. 80693-00-1], 2,2'-methylenebis (4,6-di-t-butylphenyl) octyl-phosphite [CAS-no. 126050-54-2], 1,1,3-Tris (2-methyl-4-ditridecyl phosphite-5-t-butylphenyl) butane [CAS-no. 68958-97-4], 4,4'-Butylidenebis (3-methyl-6-t-butylphenyl-di-tridecyl) phosphate [CAS-no. 13003-12-8], Bis(2,4-dicumylphenyl)-pentaerythritol diphosphite [CAS-no. 154862-43-8], Bis(2-methyl-4,6-bis(1,1-dimethylethyl) phenyl) phosphorous acid ethylester [CAS-no. 145650-60-8], 2,2',2"-nitrilo triethyl-tris(3,3',5,5'-tetra-t-butyl-1,1'-biphenyl-2,2'-diyl)phosphite) [CAS-no. 80410-33-9], Phosphorous acid, cyclic butylethyl propandiol, 2,4,6-tri-t-butylphenyl ester [CAS-no. 161717-32-4], 6-3-(3-tert-Butyl-4-hydroxy-5-methylphenyl) propoxy)-2,4,8,10-tetra-tert.butyldibenz (d,t)(1.3.2) dioxaphosphepin [CAS-no. 203255-81-6], Tetrakis-(2,4-di-t-butyl-5-methyl-phenyl)-4,4'-biphenylen-di-phosphonite [CAS-no. 147192-62-9] whereof Tris (2,4-ditert-butylphenyl)phosphate is preferred.

Preferably, stabilizer (E2) is selected from compounds of the following formula (VII)

$$R^{20}-S-R^{21},\quad(VII)$$

wherein $R^{20}$ and $R^{21}$ independently are an aliphatic or aromatic hydrocarbyl radical, optionally comprising heteroatoms, preferably $R^{20}$ or $R^{21}$, more preferably $R^{20}$ and $R^{21}$, independently are an aliphatic hydrocarbyl radical, optionally comprising heteroatoms, preferably comprising from 4 to 50 C-atoms, more preferably from 10 to 30 C-atoms.

Furthermore, preferably $R^{20}$ or $R^{21}$, more preferably $R^{20}$ and $R^{21}$, comprise(s) at least one ester group.

More preferably, stabilizer (E2) is selected from compounds of the following formula (VIII)

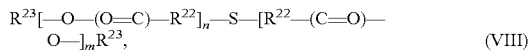

$$R^{23}[-O-(O=C)-R^{22}]_n-S-[R^{22}-(C=O)-O-]_m R^{23},\quad(VIII)$$

wherein n, m are each independently selected from 0 or 1, preferably at least one of n or m is 1, more preferably n=m=1;

each $R^{22}$ if present, is independently selected from $C_2$ to $C_{20}$ hydrocarbyl groups, preferably independently selected from $C_2$ to $C_{15}$ hydrocarbylene groups, more preferably independently selected from $C_2$ to $C_{10}$ aliphatic hydrocarbylene groups and most preferably selected from $C_2$ to $C_6$ alkylene groups, e.g. ethylene (—$CH_2$—$CH_2$—); and each $R^{23}$ is independently selected from $C_5$ to $C_{25}$ hydrocarbyl groups, preferably each $R^{23}$ is independently selected from $C_{10}$ to $C_{20}$ hydrocarbyl groups, more preferably each $R^{23}$ is independently selected from $C_{10}$ to $C_{20}$ alkyl groups and most preferably each $R^{23}$ is independently selected from $C_{10}$ to $C_{20}$ linear alkyl groups.

Preferably, stabilizer (E3) is selected from compounds of the following formula (IX)

$$R^{31}-(NH)-R^{30}\quad(IX)$$

wherein $R^{30}$ is selected from aliphatic or aromatic hydrocarbyl radicals comprising from 4 to 50 carbon atoms, preferably 8 to 30 carbon atoms, more preferably 10 to 18 carbon atoms and, optionally, comprising heteroatoms;

$R^{31}$ is selected from aliphatic or aromatic hydrocarbyl radicals comprising from 4 to 50 carbon atoms, preferably 8 to 30 carbon atoms, more preferably 10 to 20 carbon atoms and, optionally, comprising heteroatoms.

$R^{30}$ preferably does not contain heteroatoms. However, if heteroatoms are present in $R^{30}$ they are preferably amine groups, more preferably NH-groups.

$R^{31}$ preferably contains up to 5 heteroatoms, more preferably up to 3 heteroatoms and most preferably up to 1 heteroatom. The heteroatom(s) in $R^{31}$ may be sulphur, oxygen and nitrogen, preferably is/are nitrogen, more preferably amine groups and most preferably NH-group(s). A sulfonic acid amide group may also be present in $R^{31}$.

Preferably, component (E) is selected from phosphorous containing stabilizer (E1) in any of the above described embodiments.

Preferably the amount of component (C) is not more than 0.10 wt. %, more preferably not more than 0.080 wt. % and most preferably not more than 0.060 wt. % based on the polyethylene composition. Usually component (C) is present in an amount of at least 0.001 wt.%, preferably in an amount of at least 0.010 wt. %, more preferably at least 0.02 wt. % based on the polyethylene composition.

Preferably the amount of component (D) is at least 0.080 wt. %, more preferably at least 0.100 wt. %, even more preferably at least 0.120 wt. % and most preferably at least 0.130 wt. % based on the polyethylene composition. Usually component (D) is present in an amount of not more than 0.40 wt. %, preferably not more than 0.25 wt. % and most preferably not more than 0.20 wt. % based on the polyethylene composition.

In case component (E) is present in the polyethylene composition, component (E) is preferably present in an amount of not more than 0.10 wt. %, more preferably of not more than 0.080 wt. % and most preferably of not more than 0.060 wt.% based on the polyethylene composition. Usually, in case component (E) is present in an amount of at least 0.001 wt. %, preferably in an amount of at least 0.010 wt. %, more preferably at least 0.02 wt. % based on the polyethylene composition.

The weight ratio (D):(C) in the polyethylene composition is preferably at least 1.0, more preferably is at least 1.5, even more preferably is at least 2.0, even more preferably is at least 2.2 and most preferably at least 2.4.

Further, preferably the weight ratio (D):(C) in the polyethylene composition is not more than 4.5, more preferably not more than 4.0, even more preferably not more than 3.5, even more preferably not more than 3.2 and most preferably not more than 3.0.

In case component (E) is present, the weight ratio (D):(E) in the polyethylene composition is preferably at least 1.0, more preferably is at least 1.5, even more preferably is at least 2.0, even more preferably is at least 2.2 and most preferably at least 2.4.

Further, in case component (E) is present, preferably the weight ratio (D):(E) in the polyethylene composition is not more than 4.5, more preferably not more than 4.0, even more preferably not more than 3.5, even more preferably not more than 3.2 and most preferably not more than 3.0.

In case component (E) is present, the weight ratio (D):[(E)+(C)] in the polyethylene composition is preferably at least 0.80, more preferably is at least 1.0, even more preferably is at least 1.1 and most preferably is at least 1.2.

Further, in case component (E) is present, preferably the weight ratio (D):[(E)+(C)] in the polyethylene composition is not more than 2.5, more preferably not more than 2.0, even more preferably not more than 1.8 and most preferably not more than 1.6.

Preferably, the sum of (E), if present, (C) and (D) is at least 0.225 wt. %, more preferably at least 0.230 wt. %, even more preferably at least 0.235 wt. % based on the polyethylene composition. Usually, the sum of (E), if present, (C) and (D) is not more than 0.55 wt. %, preferably not more than 0.45 wt. % and most preferably not more than 0.35 wt. % based on the polyethylene composition.

In case component (E) is present, the sum of (C)+(D) is preferably at least 0.120 wt. %, more preferably is at least 0.140 wt. %, even more preferably is at least 0.160 wt. % and most preferably at least 0.180 wt. % of the polyethylene composition. Usually, in case component (E) is present, the sum of (C)+(D) is not more than 0.55 wt. %, preferably not more than 0.45 wt. % and most preferably not more than 0.35 wt. % based on the polyethylene composition.

Components (E), if present, (C) and (D) may also consist of more than one compound whereby each compound fulfills the features of (C), (D) and (E) respectively. Usually each of components (E), if present, (C) and (D) consist of not more than three different compounds, preferably, not more than two different compounds.

Preferably, the polyethylene composition does not comprise any phenol-type stabilizers besides components (E), if present, (C) and (D), more preferably the polyethylene composition does not comprise
- phosphorous containing stabilizer;
- sulphur containing stabilizers;
- nitrogen containing stabilizers; and
- phenol-type stabilizers besides components (E), if present, (C) and (D).

Preferably, the polyethylene composition further comprises carbon black in an amount of not more than 10 wt. %, more preferably of not more than 7.5 wt. %, even more preferably of not more than 5.0 wt. % and most preferably of not more than 3.5 wt. %; further, preferably the polyethylene composition comprises carbon black in an amount of at least 0.1 wt. %, more preferably of at least 0.5 wt. %, even more preferably of at least 1.0 wt. % and most preferably of at least 1.5 wt. %.

The polyethylene composition preferably further comprises an acid neutralising agent and/or lubricant, more preferably a compound is used which is an acid neutralising agent and a lubricant.

The acid neutralising agent and/or lubricant is preferably synthetic hydrotalcite, magnesium oxide or metal salts of carboxylic acid salts, wherein the metal is selected from Li, Na, K, Rb, Cs, Mg, Ca, Sr, Ba, transition metals of the $4_{th}$, $5^{th}$ and $6^{th}$ period of the periodic table of the elements and mixtures thereof, preferably the metal is selected from Li, Na, K, Mg, Ca, Sr, Ba, Zn and mixtures thereof.

Preferred metal salts of carboxylic acid salts are Li-Stearate, Na-Stearate, K-Stearate, Li-Myristate, Na-Myristate, K-Myristate, Ca-Stearate, Mg-Stearate, Ca-12-hydroxy stearate, Mg-12-hydroxy stearate, Ca-Myristate, Ca-Palmitate, Ca-Laurate, Mg-Myristate, Mg-Palmitate, Mg-Laurate and Zn-Stearate.

The acid neutralising agent is preferably present in an amount of at least 0.01 wt. %, more preferably at least 0.05 wt. % and most preferably at least 0.10 wt. % based on the polyethylene composition.

Preferably, the acid neutralising agent is present in an amount of not more than 0.50 wt. %, more preferably not more than 0.35 wt. % and most preferably of not more than 0.20 wt.%.

Usually, a base resin such as that of the present invention, comprising two polyethylene fractions, which have been produced under different polymerisation conditions resulting in different weight average molecular weights for the fractions, is referred to as "multimodal". The prefix "multi" relates to the number of different polymer fractions the base resin is consisting of. Thus, for example, a base resin consisting of two fractions only is called "bimodal".

A multimodal molecular weight distribution (MWD) is reflected in a gel permeation chromatography (GPC) curve exhibiting two or more component polymers wherein the number of component polymers corresponds to the number of discernible peaks, or one component polymer may exist as a hump, shoulder or tail relative to the MWD of the other component polymer.

For example, if a polymer is produced in a sequential multistage process, utilising reactors coupled in series and using different conditions in each reactor, the polymer fractions produced in the different reactors will each have their own molecular weight distribution and weight average molecular weight. When the molecular weight distribution curve of such a polymer is recorded, the individual curves from these fractions are superimposed into the molecular weight distribution curve for the total resulting polymer product, usually yielding a curve with two or more distinct maxima.

Preferably, the base resin is multimodal or bimodal, more preferably bimodal.

It has been found that the pressure resistance, processability and mechanical properties of pipes comprising a base resin as specified in the following are further improved by the combination of stabilizers according to the embodiments of the invention.

The base resin may also be and preferably is produced in a multistage process wherein e.g. fractions (A) and (B) are produced in subsequent stages.

Preferably in the base resin according the invention at least one of fractions (A) and (B), preferably (B), is produced in a gas-phase reaction.

Further preferably, one of the fractions (A) and (B) of the base resin, preferably fraction (A), is produced in a slurry reaction, preferably in a loop reactor, and one of the fractions (A) and (B), preferably fraction (B), is produced in a gas-phase reaction.

Further, the base resin preferably is produced in a multistage process. Polymers produced in such a process are also designated as "in-situ"-blends.

A multistage process is defined to be a polymerisation process in which a polymer comprising two or more fractions is produced by producing each or at least two polymer fraction(s) in a separate reaction stage, usually with different reaction conditions in each stage, in the presence of the reaction product of the previous stage which comprises a polymerisation catalyst.

Accordingly, it is preferred that fraction (A) and (B) of the base resin are produced in different stages of a multistage process.

Preferably, the multistage process comprises at least one gas phase stage in which, preferably, fraction (B) is produced.

Further preferably, fraction (B) is produced in a subsequent stage in the presence of fraction (A) which has been produced in a previous stage, more preferably fraction (A) is produced in a slurry reactor and fraction (B) is produced in a gas phase reactor, even more preferably fraction (A) is produced in a loop reactor and fraction (B) is produced in a gas phase reactor It is previously known to produce multimodal, in particular bimodal, olefin polymers, such as multimodal polyethylene, in a multistage process comprising two or more reactors connected in series. As instance of this prior art, mention may be made of EP 517 868, including all its preferred embodiments as described therein, as a preferred multistage process for the production of the polyethylene composition according to the invention.

Preferably, the main polymerisation stages of the multistage process are such as described in EP 517 868, i.e. the production of fractions (A) and (B) is carried out as a combination of slurry polymerisation for fraction (A)/gas-phase polymerisation for fraction (B). The slurry polymerisation is preferably performed in a so-called loop reactor. Further preferably, the slurry polymerisation stage precedes the gas phase stage.

The polymerisation catalysts include coordination catalysts of a transition metal, such as Ziegler-Natta (ZN), metallocenes, non-metallocenes, Cr-catalysts etc. The catalyst may be supported, e.g. with conventional supports including silica, Al-containing supports and magnesium dichloride based supports. Preferably the catalyst is a ZN catalyst, more preferably the catalyst is a non-silica supported ZN catalyst, and most preferably a $MgCl_2$-based ZN catalyst.

The Ziegler-Natta catalyst further preferably comprises a group 4 (group numbering according to new IUPAC system) metal compound, preferably titanium, magnesium dichloride and aluminum.

The catalyst may be commercially available or be produced in accordance or analogously to the literature. For the preparation of a catalyst usable in the invention reference is made to WO/2004/055068 and WO/2004/055069 of Borealis and EP 0 810 235. In particular to the general and all preferred embodiments of the catalysts described therein as well as the methods for the production of the catalysts. Particularly preferred Ziegler-Natta catalysts are described in EP 0 810 235.

The resulting end product consists of an intimate mixture of the polymers from the reactors, the different molecular-weight-distribution curves of these polymers together forming a molecular-weight-distribution curve having a broad maximum or several maxima, i.e. the end product is a multimodal polymer mixture.

It is preferred that the multimodal base resin of the polyethylene composition according to the invention is a bimodal polyethylene mixture consisting of fractions (A) and (B) and optionally a prepolymer fraction. It is also preferred that this bimodal polymer mixture has been produced by polymerisation as described above under different polymerisation conditions in two or more polymerisation reactors connected in series. Owing to the flexibility with respect to reaction conditions thus obtained, it is most preferred that the polymerisation is carried out in a loop reactor/a gas-phase reactor combination.

Preferably, the polymerisation conditions in the preferred two-stage method are so chosen that the low-molecular weight polymer having no content of comonomer is produced in one stage, preferably the first stage, owing to a high content of chain-transfer agent (hydrogen gas), whereas the high-molecular weight polymer having a content of comonomer is produced in another stage, preferably the second stage. The order of these stages may, however, be reversed.

In the preferred embodiment of the polymerisation in a loop reactor followed by a gas-phase reactor, the polymerisation temperature in the loop reactor preferably is 85 to 115° C., more preferably is 90 to 105° C., and most preferably is 92 to 100° C., and the temperature in the gas-phase reactor preferably is 70 to 105° C., more preferably is 75 to 100° C., and most preferably is 82 to 97° C.

A chain-transfer agent, preferably hydrogen, is added as required to the reactors, and preferably 400 to 1200 moles of $H_2$/kmoles of ethylene are added to the reactor, when the LMW fraction is produced in this reactor, and 0 to 50 moles of $H_2$/kmoles of ethylene are added to the gas phase reactor when this reactor is producing the HMW fraction.

The base resin of the invention is preferably produced in a process comprising a compounding step, wherein the composition of the base resin, i.e. the blend, which is typically obtained as a base resin powder from the reactor, is extruded in an extruder and then pelletised to polymer pellets in a manner known in the art.

Optionally, additives or other polymer components can be added to the polyethylene composition during the compounding step in the amount as described above. Preferably, the composition of the invention obtained from the reactor is compounded in the extruder together with additives in a manner known in the art.

The extruder may be e.g. any conventionally used extruder, e.g Battenfeld extruders, Krauss-Maffei or Cincinnatti PE pipe extruders.

Preferably component (A) has a lower weight average molecular weight than component (B).

Preferably, component (A) has a comonomer content of not more than 10 mol %, more preferably of not more than 5 mol %, even more preferably of not more than 2 mol % and most preferably component (A) is an ethylene homopolymer, i.e. does not contain comonomers.

Preferably, component (A) has an $MFR_2$, measured according to ISO 1133 at 190° C. and under a load of 2.16 kg, of not less than 150 g/10 min, more preferably not less than 200 g/10 min, even more preferably not less than 250 g/10 min and most preferably of not less than 275 g/10 min.

Further, preferably, component (A) has an $MFR_2$, measured according to ISO 1133 at 190° C. and under a load of 2.16 kg, of not more than 1000 g/10 min, more preferably of not more than 850 g/10 min, even more preferably of not more than 700 g/10 min, even more preferably of not more than 600 g/10 min even more preferably of not more than 500 g/10 min and most preferably of not more than 450 g/10 min.

Preferably, component (A) has a density, measured according to ISO 1183/1872-2B, of not less than 940 kg/m³, more preferably of not less than 950 kg/m³, even more preferably of not less than 960 kg/m³ and most preferably of not less than 970 kg/m³.

Further, preferably, component (A) has a density, measured according to ISO 1183/1872-2B, of not more than 980 kg/m³ more preferably of not more than 975 kg/m³.

Preferably, component (A) has a weight average molecular weight of at least 10000 g/mol, more preferably at least 15000 g/mol and most preferably at least 20000 g/mol.

Further, preferably, the weight average molecular weight of component (A) is 100000 g/mol or less, more preferably 80000 g/mol or less and most preferably 40000 g/mol or less.

Preferably, component (A) has a molecular weight distribution (MWD) of at least 10.0, more preferably of at least 11.0, even more preferably of at least 12.0 and most preferably of at least 12.5.

The MWD of component (A) is preferably 16.0 or less, more preferably 15.0 or less, even more preferably 14.5 or less and most preferably 14.0 or less.

Preferably, component (B) has a comonomer content of at least 0.10 mol %, more preferably of at least 0.25 mol %, even more preferably of at least 0.40 mol % and most preferably of at least 0.50 mol % based on component (B).

Usually component (B) has a comonomer content of not more than 10 mol %, preferably, component (B) has a comonomer content of not more than 4.5 mol %, more preferably of not more than 3.0 mol %, even more preferably of not more than 1.5 mol % and most preferably of not more than 0.8 mol % based on component (B).

Preferably, component (B) has a density measured according to ISO 1183/1872-2B, of at least 920 kg/m$^3$, more preferably of at least 930 kg/m$^3$ and most preferably of at least 940 kg/m$^3$.

Further, preferably, component (B) has a density measured according to ISO 1183/1872-2B, of not more than 970 kg/m$^3$, more preferably of not more than 960 kg/m$^3$ and most preferably of not more than 955 kg/m$^3$.

Component (B) and (A) (in case (A) is an ethylene copolymer) may comprise as comonomer any compound which includes unsaturated polymerizable groups.

Thus for example unsaturated compounds, such as $C_3$- to $C_{20}$-olefins (including cyclic and polycyclic olefins (e.g. norbornene)), polyenes and $C_6$- to $C_{20}$-dienes, may be included in a comonomer mixture with lower olefins, e.g. $C_{2-5}$-olefins. Diolefins (i.e. dienes) are suitably used for introducing long chain branching into the resultant polymer. Examples of such dienes include linear dienes such as 1,5-hexadiene, 1,6-heptadiene, 1,8-nonadiene, 1,9-decadiene, etc.

Preferably, the comonomer(s) used for the production of (B) and optionally (A) are $C_3$- to $C_{20}$-alpha-olefins e.g. propene, but-1-ene, hex-1-ene, 4-methyl-pent-1-ene, oct-1-ene etc., more preferably $C_4$- to $C_{10}$-alpha-olefins and most preferably $C_6$- to $C_8$-alpha-olefins, e.g. 1-hexene.

Preferably, the total comonomer content of components (A) and (B) is at least 0.05 mol %, more preferably is at least 0.10 mol %, even more preferably is at least 0.15 mol % and most preferably is at least 0.2 mol % based on the total amount of components (A) and (B).

Further, preferably, the total comonomer content of components (A) and (B) is not more than 4.0 mol %, more preferably is not more than 2.5 mol %, even more preferably is not more than 1.0 mol % and most preferably is not more than 0.8 mol %. based on the total amount of components (A) and (B).

Preferably, the base resin has an $MFR_5$, measured according to ISO 1133 at 190° C. and under a load of 5.0 kg, of at least 0.05 g/10 min, more preferably of at least 0.10 g/10 min and most preferably of at least 0.15 g/10 min.

Further, preferably, the base resin has an $MFR_5$, measured according to ISO 1133 at 190° C. and under a load of 5.0 kg, of not more than 2.0 g/10 min, more preferably of not more than 1.0 g/10 min, even more preferably of not more than 0.5 g/10 min and most preferably of not more than 0.3 g/10 min.

Preferably, the polyethylene composition has an $MFR_5$, measured according to ISO 1133 at 190° C. and under a load of 5.0 kg, of at least 0.05 g/10 min, more preferably of at least 0.10 g/10 min and most preferably of at least 0.15 g/10 min.

Further, preferably, the polyethylene composition has an $MFR_5$, measured according to ISO 1133 at 190° C. and under a load of 5.0 kg, of not more than 2.0 g/10 min, more preferably of not more than 1.0 g/10 min, even more preferably of not more than 0.5 g/10 min and most preferably of not more than 0.3 g/10 min.

Preferably, the polyethylene composition has an $MFR_{21}$, measured according to ISO 1133 at 190° C. and under a load of 21.6 kg of at least 1.0 g/10 min, more preferably of at least 3.0 g/10 min and most preferably of at least 5.0 g/10 min.

Further, preferably, the polyethylene composition has an $MFR_{21}$, measured according to ISO 1133 at 190° C. and under a load of 21.6 kg of not more than 25 g/10 min, more preferably of not more than 20 g/10 min, even more preferably of not more than 15 g/10 min and most preferably of not more than 10 g/10 min.

Preferably, the polyethylene composition has a molecular weight distribution (MWD) of at least 20, more preferably of at least 25, even more preferably of at least 30 and most preferably of at least 35.

The polyethylene composition preferably has an MWD of 100 or less, more preferably 80 or less, even more preferably 65 or less and most preferably 55 or less.

Preferably, the polyethylene composition has a weight average molecular weight of at least 100000 g/mol, more preferably at least 150000 g/mol, even more preferably at least 200000 g/mol and most preferably at least 250000 g/mol.

Further, preferably, the weight average molecular weight of the polyethylene composition is 550000 g/mol or less, more preferably 450000 g/mol or less and most preferably 350000 g/mol or less.

Preferably, the polyethylene composition has an $FRR_{21/5}$ of at least 10, more preferably of at least 20 and most preferably of at least 30.

Further, preferably, the polyethylene composition has an $FRR_{21/5}$ of not more than 80, more preferably of not more than 65 and most preferably of not more than 50.

Preferably, the polyethylene composition has a density of more than or equal to 952 kg/m$^3$, more preferably more than or equal to 954 kg/m$^3$ most preferably more than or equal to 956 kg/m$^3$. Usually, the density of the polyethylene composition is 964 kg/m$^3$ or less.

Preferably, the weight ratio (A):(B) in the polyethylene composition is not more than 60:40, more preferably not more than 55:45, most preferably not more than 52:48.

Further, the weight ratio (A):(B) in the polyethylene composition is preferably at least 40:60, more preferably at least 45:55, most preferably at least 48:52.

Preferably, the polyethylene composition has a complex viscosity $\eta^*_{2.7}$ of at least 250 kPas, more preferably of at least 270 kPas, even more preferably of at least 285 kPas and most preferably of at least 300 kPas.

Further, preferably, the polyethylene composition has a complex viscosity $\eta^*_{2.7}$ of not more than 500 kPas, more preferably of not more than 450 kPas and most preferably of not more than 400 kPas.

Preferably, the polyethylene composition has a shear thinning index $SHI_{2.7/210}$ of at least 40, more preferably of at least 50 and most preferably of at least 60.

Further, preferably, the polyethylene composition has a shear thinning index $SHI_{2.7/210}$ of not more than 150, more preferably of not more than 120, even more preferably of not more than 100, even more preferably of not more than 90 and most preferably of not more than 80.

Preferably, the polyethylene composition has a viscosity at a shear stress of 747 Pa ($\eta_{747}$) of at least 430 kPas, more preferably of at least 460 kPas, even more preferably of at least 500 kPas, even more preferably of at least 540 kPas and most preferably of at least 560 kPas.

Further, preferably, the polyethylene composition has a viscosity at a shear stress of 747 Pa ($\eta_{1747}$) of not more than 750 kPas, more preferably of not more than 700 kPas and most preferably of not more than 650 kPas.

Preferably, the polyethylene composition has an impact strength at 0° C. of at least 10.0 kJ/m$^2$, more preferably of at least 12.0 kJ/m$^2$, even more preferably of at least 14.0 kJ/m$^2$, even more preferably of at least 16.0 kJ/m$^2$ and most preferably of at least 17.0 kJ/m² in a Charpy notched test according to ISO 179-1/1eA:2000. Usually said impact strength will be below 25 kJ/m².

Preferably, the pipe has a stability in a full notch creep test (FNCT) measured according to ISO 16770:2004 of at least 3000 h, more preferably of at least 4000 h, more preferably of at least 5000 h, even more preferably of at least 6000 h and most preferably of at least 7000 h. Usually said stability will be below 15000 h.

Further, preferably, the pipe has a stability in the notch test, measured according to ISO 13479:1997 on 110 SDR 11 pipes at a temperature of 80° C. and a pressure of 9.2 bar, of at least 2000 h, more preferably of at least 2500 h and most preferably of at least 2700 h. Usually said stability will be below 5000 h.

Preferably, the pipe has a stability in the PENT test, measured according to ASTM F 1473 of at least 2500 h, more preferably of at least 3000 h and most preferably of at least 3400 h. Usually said stability will be below 5000 h.

In addition to the stabilizers in the polyethylene composition, other usual types of additives for utilization with polyethylenes may be present in the polyethylene composition. In case such other types of additives are present, the amount of these additives is usually 10 wt % or below, preferably 5 wt % or below, still more preferred 3 wt % or below of the total polyethylene composition.

The present invention is furthermore directed to the use of
a phenol-type stabilizer (C); and
a phenol-type stabilizer (D);
whereby stabilizers (C) and (D) are different
and, optionally,
a further stabilizer (E) selected from
 phosphorous containing stabilizer (E1);
 sulphur containing stabilizers (E2);
 nitrogen containing stabilizer (E3); and/or
 mixtures thereof;
for increasing the crack growth resistance of pipes.

The crack growth resistance is usually determined by the PENT test according to ASTM F 1473 and/or by the full notch creep test (FNCT) according to ISO 16770:2004.

Preferably, the pipes are polyethylene pipes, more preferably the polyethylene pipes comprising,
a base resin as described herein.

TEST METHODS

Comonomer Content (FTIR)

Comonomer content was determined in a known manner based on Fourier transform infrared spectroscopy (FTIR) determination using Nicolet Magna 550 IR spectrometer together with Nicolet Omnic FTIR software.

Films having a thickness of about 220 to 250 μm were compression moulded from the samples. Similar films were made from calibration samples having a known content of the comonomer. The thicknesses were measured from at least five points of the film. The films were then rubbed with sandpaper to eliminate reflections. The films were not touched by plain hand to avoid contamination. For each sample and calibration sample at least two films were prepared. The films were pressed from pellets by using a Graceby Specac film press at 150° C. using 3+2 minutes preheating time, 1 minute compression time and 4 to 5 minutes cooling time. For very high molecular weight samples the preheating time may be prolonged or the temperature increased.

The comonomer content was determined from the absorbance at the wave number of approximately 1378 cm⁻¹. The comonomer used in the calibration samples was the same as the comonomer present in the samples. The analysis was performed by using the resolution of 2 cm⁻¹, wave number span of from 4000 to 400 cm⁻¹ and the number of sweeps of 128. At least two spectra were run from each film.

The comonomer content was determined from the spectrum from the wave number range of from 1430 to 1100 cm⁻¹. The absorbance is measured as the height of the peak by selecting the so-called short or long base line or both. The short base line is drawn in about 1410-1320 cm⁻¹ through the minimum points and the long base line about between 1410 and 1220 cm⁻¹. Calibrations need to be done specifically for each base line type. Also, the comonomer content of the unknown sample needs to be within the range of the comonomer contents of the calibration samples.

The conversion from wt. % to mol % is made using the following formula $$n_1 = \frac{1}{1 + \frac{M_1}{M_2} \cdot \left(\frac{1}{w_1} - 1\right)}$$

wherein
$w_1$ is the weight fraction of the comonomer, for example, in case the comonomer content is 1.9 wt. %, $w_1$=0.019
$M_1$ is the molecular weight of monomer 1
$M_2$ is the molecular weight of monomer 2
For example, in an ethylene-hexene copolymer monomer 1 is hexene and monomer 2 is ethylene and, thus, $M_1$ is 84.16 g/mol and $M_2$ is 28.05 g/mol
$n_1$ is the molar fraction of the comonomer
Density:

Density of the polymer was measured according to ISO 1183/1872-2B.

Melt Flow Rate

The melt flow rate (MFR) is determined according to ISO 1133 and is indicated in g/10 min. The MFR is an indication of the melt viscosity of the polymer. The MFR is determined at 190° C. for PE. The load under which the melt flow rate is determined is usually indicated as a subscript, for instance $MFR_2$ is measured under 2.16 kg load, $MFR_5$ is measured under 5 kg load or $MFR_{21}$ is measured under 21.6 kg load.

Flow Rate Ratio (FRR)

The quantity FRR (flow rate ratio) is an indication of molecular weight distribution and denotes the ratio of flow rates at different loads. Thus, $FRR_{21/5}$ denotes the value of $MFR_{21}/MFR_5$, according to ISO 1133.

Molecular Weight Distribution and Average Molecular Weights:

The weight average molecular weight Mw and the molecular weight distribution (MWD=Mw/Mn wherein Mn is the number average molecular weight and Mw is the weight average molecular weight) is measured according to ISO 16014-4:2003 and ASTM D 6474-99. A Waters GPCV2000 instrument, equipped with refractive index detector and online viscosimeter was used with 2×GMHXL-HT and 1×G7000HXL-HT TSK-gel columns from Tosoh Bioscience and 1,2,4-trichlorobenzene (TCB, stabilized with 250 mg/L 2,6-Di tert butyl-4-methyl-phenol) as solvent at 140° C. and at a constant flow rate of 1 mL/min. 209.5 μL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants were used as given in ASTM D 6474-99 which is herewith incorporated by reference. All samples were prepared by dissolving 0.5-4.0 mg of polymer in 4 mL (at 140° C.) of stabilized TCB (same as mobile phase) and keeping for maximum 3 hours at a maximum temperature of 160° C. with continuous gentle shaking prior sampling in into the GPC instrument.

As it is known in the art, the weight average molecular weight of a blend can be calculated if the molecular weights of its components are known according to:

$$Mw_b = \sum_i w_i \cdot Mw_i$$

where $Mw_b$ is the weight average molecular weight of the blend, $w_i$ is the weight fraction of component "i" in the blend and $Mw_i$ is the weight average molecular weight of the component "i".

The number average molecular weight can be calculated using the well-known mixing rule:

$$\frac{1}{Mn_b} = \sum_i \frac{w_i}{Mn_i}$$

where $Mn_b$ is the number average molecular weight of the blend, $w_i$ is the weight fraction of component "i" in the blend and $Mn_i$ is the number average molecular weight of the component "i".

Notch Test

The slow crack propagation resistance is determined according to ISO 13479:1997 in terms of the number of hours the pipe withstands a certain pressure at a certain temperature in the Notch test before failure. Pipes with a diameter of 110 mm are used. Herein, a pressure of 9.2 bars and a temperature of 80° C. have been used to obtain an aimed stress of 4.6 MPa. The measurement is made on a 110 SDR 11 pipe.

PENT (Pennsylvania Notch Test)

The PENT test was done according to ASTM F 1473. The specimen dimensions being 50.0 mm (long)×25.0 mm (wide)×10.0 mm (thick), and the main notch depth was 3.50 mm. The side grooves were 1.00 mm. The stress based on the un-notched area was 2.8 MPa. The test temperature was 80° C. The specimens are compression moulded plaques from pellets.

Full Notch Creep Test (FNCT)

The full notch creep test was done according to ISO 16770: 2004.

The conditions applied were:

A 10×10×100 mm bar sample was notched on four sides with a razor blade to a depth of 1.6 mm. The bar was immersed in a solution of 2.0 wt-% Arkopal N-100 at 80° C. The stress load was 4.0 MPa applied based on the initial remaining cross section at the place where the notches were introduced.

The test bars were cut from compression molded sheets. The compression molding was done according to DS/EN ISO 1872/2 with the following conditions applied:

| | |
|---|---|
| Moulding temp: | 200° C. |
| Average cooling time | 15° C./min |
| Demoulding temp | ≤40° C. |
| Full pressure | 10 MPa (positive mould) |
| Full pressure time | 5 ± 1 min |
| Preheating pressure | Contact (close to 0) |
| Preheating time | 5-15 min |

Charpy Impact

Charpy impact strength was determined according to ISO 179-1/1eA:2000 on V-notched samples (specimen type 1, 80×10×4 mm) at 0° C. (Charpy impact strength (0° C.)) made by compression moulding, with a thickness of 4 mm. Moulding temperature was 200° C., and average cooling rate was 15 K/min (ISO 1872-2).

Rheology, (Dynamic Viscosity, Shear Thinning Index):

The rheological parameters Shear Thinning Index SHI and Viscosity are determined by using a a Rheometrics Phisica MCR 300 Rheometer on compression moulded samples under nitrogen atmosphere at 190° C. using 25 mm diameter plates and plate and plate geometry with a 1.2 mm gap. The oscillatory shear experiments were done within the linear viscosity range of strain at frequencies from 0.05 to 300 rad/s (ISO 6721-1). Five measurement points per decade were made.

The values of the complex viscosity ($\eta^*$) were expressed as a function of complex modulus which was used as an approximation of shear stress.

$\eta^*_{2.7}$ is used as abbreviation for the complex viscosity at the value of the complex modulus of 2.7 kPa. The method of determining the shear rates and the technical background is described in detail in WO 00/22040. This document is herewith incorporated by reference.

Shear thinning index (SHI), which correlates with MWD and is independent of $M_w$, was calculated according to Heino ("Rheological characterization of polyethylene fractions" Heino, E. L., Lehtinen, A., Tanner J., Seppälä, J., Neste Oy, Porvoo, Finland, Theor. Appl. Rheol., Proc. Int. Congr. Rheol., 11th (1992), 1, 360-362, and "The influence of molecular structure on some rheological properties of polyethylene", Heino, E. L., Borealis Polymers Oy, Porvoo, Finland, Annual Transactions of the Nordic Rheology Society, 1995.) which are all herewith incorporated by reference.

SHI value is obtained by calculating the complex viscosities at given values of complex modulus and calculating the ratio of the two viscosities. For the present case, using the values of complex modulus of 2.7 kPa and 210 kPa, then $\eta^*(2.7\ kPa)$ and $\eta^*(210\ kPa)$ are obtained at a constant value of complex modulus of 2.7 kPa and 210 kPa, respectively. The shear thinning index $SHI_{2.7/210}$ is then defined as the ratio of the two viscosities $\eta^*(2.7\ kPa)$ and $\eta^*(210\ kPa)$, i.e. $\eta(2.7)/\eta(210)$.

Definition for Viscosity at a Shear Stress of 747 Pa ($\eta_{747}$)

The definition and measurement conditions are described in detail on page 8 line 29 to page 11, line 25 of WO 00/22040 which is herewith incorporated by reference.

EXAMPLES

The solid transition metal component of the catalyst was a commercial catalyst supplied by Engelhard Corporation, Pasadena, USA, under the trade name of Lynx 200™. The catalyst was precontacted with triethyl aluminum (TEA) at 2.5:1 Al/Ti molar ratio for at least 2 hours at ambient temperature. In addition, triethyl aluminum (TEA) was used as a cocatalyst so that the molar ratio of TEA to Ti in the catalyst component was 15 mol/mol in the first reactor. The operation conditions are shown in Table 1 below.

TABLE 1

|  | Inventive example 1 | comparative example 2 | comparative example 3 |
|---|---|---|---|
| Loop reactor | | | |
| pressure [bar] | 61 | 61 | 61 |
| $MFR_2$ [g/10 min] | 310 | 405 | 317 |
| Density [kg/m$^3$] | >970 | >970 | >970 |
| temperature [° C.] | 95 | 95 | 95 |
| $H_2/C_2$ [mol/kmol] | 830 | 774 | 860 |
| Mn [g/mol] | 2240 | | |
| Mw [g/mol] | 29400 | | |
| MWD | 13.1 | | |
| GPR-material | | | |
| pressure [bar] | 20 | 20 | 20 |
| $MFR_5$ [g/10 min] | 0.21 | 0.22 | 0.21 |
| Density [kg/m$^3$] | 947 | 948 | 947 |
| Comonomer [wt %] | hexene 1.9 | butene 0.97 | hexene 1.9 |
| C4/C2 [mol/kmol] | | 135 | |
| C6/C2 [mol/kmol] | 54 | | 57 |
| H2/C2 [mol/kmol] | 30 | 26 | 32 |
| temperature [° C.] | 85 | 85 | 85 |
| Split (GPR:Loop:Prepol.) | 50:48:2 | 52:46:2 | 50:48:2 |
| Density base resin [kg/m$^3$] | 949.2 | 949.8 | 949.2 |
| composition additives$^1$ [wt. %] | | | |
| Irgafos 168 | 0.05 | 0.11 | 0.11 |
| Irganox 1010 | 0.05 | 0.11 | 0.11 |
| Irganox 1330 | 0.135 | 0 | 0 |
| Ca-stearate | 0.15 | 0.15 | 0.15 |
| Carbon black | 2.2 | 2.2 | 2.2 |
| $MFR_5$ [g/10 min] | 0.21 | 0.23 | 0.23 |
| $MFR_{21}$ [g/10 min] | 7.98 | 8.02 | 9.1 |
| $FRR_{21/5}$ | 38 | 34.3 | 39.5 |
| Density composition [kg/m$^3$] | 959 | 960 | 959 |
| $\eta^*_{2.7}$ [kPas] | 302 | 266 | 248 |
| $SHI_{2.7/210}$ | 70 | 49 | 77 |
| $\eta_{747}$ [kPas] | 568 | 460 | 558 |
| Mn [g/mol] | 6900 | | |
| Mw [g/mol] | 305000 | | |
| Mz [g/mol] | 2138000 | | |
| MWD | 44 | | |
| Properties | | | |
| Notch test [h] | 2784 | 2364 | 2958 |
| PENT [h] | 3486 | 2766 | 2364 |
| FNCT [h] | 7048 | 1777 | 1916 |
| Impact test 0° C. [kJ/m$^2$] | 17.2 | 15.4 | 17.5 |
| (Type of failure) | (break) | (break) | (break) |

$^1$Irgafos 168: Tris(2,4-di-tert-butylphenyl)phosphite;
Irganox 1010: Pentaerythritol Tetrakis(3-(3,5-di-tert-butyl-4-hydroxyphenyl)propionate)
Irganox 1330: 3,3',3",5,5',5"-hexa-tert-butyl-a,a',a"-(mesitylene-2,4,6-triyl)tri-p-cresol
all distributed by Ciba Speciality Chemicals

The invention claimed is:

1. A pipe consisting of
   a polyethylene composition which comprises
      a base resin, comprising
         a first ethylene homo- or copolymer (A); and
         a second ethylene copolymer (B);
      and the polyethylene composition further comprises
         a phenol-type stabilizer (C); and
         a phenol-type stabilizer (D);
      whereby stabilizers (C) and (D) are different,
      wherein components (C) and (D) differ in that component (C) contains at least one ester group and component (D) does not contain any ester group.

2. A pipe according to claim 1, wherein the amount of component (D) is at least 0.080 wt. % based on the polyethylene composition.

3. A pipe according to claim 1, wherein the amount of component (C) is not more than 0.10 wt. % based on the polyethylene composition.

4. A pipe according to claim 1, wherein the total comonomer content of components (A) and (B) is from 0.05 to 4.0 mol % based on the total amount of components (A) and (B).

5. A pipe according to claim 1, wherein the polyethylene composition further comprises
   an additional stabilizer (E) selected from the group consisting of
      phosphorous containing stabilizer (E1);
      sulphur containing stabilizers (E2);
      nitrogen containing stabilizers (E3); and/or
      mixtures thereof.

6. A pipe according to claim 1, wherein the polyethylene composition further comprises carbon black in an amount of 0.1 to 10 wt. % based on the polyethylene composition.

7. A pipe according to claim 1, wherein the polyethylene composition has a $FRR_{21/5}$ from 10 to 80.

8. A pipe according to claim 1, wherein the polyethylene composition has an impact strength at 0° C. of at least 10.0 kJ/m$^2$ in a Charpy notched test according to ISO 179-1/1eA: 2000.

9. A pipe according to claim 1, wherein the pipe has a stability in a full notch creep test measured according to ISO 16770:2004 of at least 3000 h.

10. A pipe according to claim 1, wherein the pipe has a stability in the notch test, measured according to ISO 13479: 1997 on 110 SDR 11 pipes at a temperature of 80° C. and a pressure of 8.0 bar, of at least 2000 h.

11. A pipe according to claim 1, wherein the pipe has a stability in the PENT test, measured according to ASTM F 1473 of at least 3000 h.

12. A pipe according to claim 1, wherein component (D) is a phenol-type stabilizer of the following formula (II):

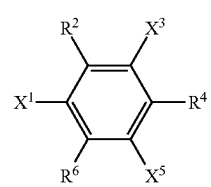

(I)

wherein
X$^1$, X$^3$ and X$^5$ are independently selected from hydrogen and hydroxyl groups, provided that at least one of X$^1$, X$^3$ and/or X$^5$ is a hydroxyl group;
and
R$^2$, R$^4$ and/or R$^6$ are independently selected from substituted or unsubstituted hydrocarbyl groups and may contain hydroxyl groups.

13. A pipe according to claim 12, wherein component (D) is a phenol-type stabilizer of the following formula (III):

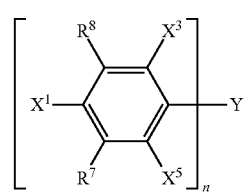

(II)

wherein
X$^1$, X$^3$ and X$^5$ are independently selected from hydrogen and hydroxyl groups, provided that at least one of X$^1$, X$^3$ and/or X$^5$ is a hydroxyl group;

n is an integer selected from 1, 2, 3, 4, 5 and 6;

$R^7$ and $R^8$ are independently selected from substituted or unsubstituted, $C_1$- to $C_{20}$-hydrocarbyl groups; and Y is a substituted or unsubstituted $C_1$- to $C_{40}$-hydrocarbyl group.

14. A method for increasing the slow crack growth resistance of pipe comprising forming said pipe from a mixture containing a first ethylene homo or copolymer (A) and a second ethylene compolymer (B) plus a phenol-type stabilizer (C); and a phenol-type stabilizer (D);

whereby stabilizers (C) and (D) are different in that component (C) contains at least one ester group and component (D) does not contain any ester group, and, optionally, an additional stabilizer (E) selected from the group consisting of phosphorous containing stabilizer (E1);

sulphur containing stabilizers (E2);

nitrogen containing stabilizers (E3); and/or mixtures thereof.

15. A polyethylene pipe having enhanced slow crack growth resistance comprising two polyethylene copolymers and two different phenol-type stabilizers, wherein one phenol-type stabilizer includes an ester group and the other phenyl-type stabilizer does not contain any ester groups, wherein the pipe has a stability in a full notch creep test (FNCT) measured according to ISO 16770:2004 of at least 3000 h; has a stability in a notch test measured according to ISO 13479: 1997 on 110 SDR 11 pipe at a temperature of 80° C. and a pressure of 9.2 bar of at least 2000 h; and has a stability in a PENT test, measured according to ASTM F 1473 of at least 3000 h.

16. A pipe according to claim 15 wherein the pipe has a stability in the full notch creep test of at least 4000 h.

17. A pipe according to claim 15 wherein the pipe has a stability in the full notch creep test of at least 5000 h.

18. A pipe according to claim 15 wherein the pipe has a stability in the full notch creep test of at least 6000 h.

19. A pipe according to claim 15 wherein the pipe has a stability in the full notch creep test of at least 7000 h.

20. A pipe according to claim 15 wherein the pipe has a stability in a PENT test of at least 3400 h.

* * * * *